April 2, 1963     E. L. DAWE ETAL     3,083,585
WHEEL STRUCTURE WITH REPLACEABLE SEGMENTS AND METHOD
Filed Oct. 10, 1961     3 Sheets-Sheet 1

INVENTORS
Ernest L. Dawe
BY Ernest L. Dawe, Jr.

Attorneys

April 2, 1963    E. L. DAWE ETAL    3,083,585
WHEEL STRUCTURE WITH REPLACEABLE SEGMENTS AND METHOD
Filed Oct. 10, 1961    3 Sheets-Sheet 2

INVENTORS
Ernest L. Dawe
BY Ernest L. Dawe, Jr.
Attorneys

April 2, 1963  E. L. DAWE ETAL  3,083,585
WHEEL STRUCTURE WITH REPLACEABLE SEGMENTS AND METHOD
Filed Oct. 10, 1961  3 Sheets-Sheet 3

INVENTORS
Ernest L. Dawe
BY Ernest L. Dawe, Jr.

Attorneys

United States Patent Office 3,083,585
Patented Apr. 2, 1963

3,083,585
WHEEL STRUCTURE WITH REPLACEABLE
SEGMENTS AND METHOD
Ernest L. Dawe, Arcata, Calif. (115 Walnut Haven Drive 10, West Covena, Calif.), and Ernest L. Dawe, Jr., Oswego, Oreg. (1512 Buckingham Way, Savannah, Ga.)
Filed Oct. 10, 1961, Ser. No. 144,252
13 Claims. (Cl. 74—243)

This invention relates to wheel structures with replaceable segments and more particularly to sprocket wheels with replaceable toothed segments and a method of replacing conventional sprocket wheels.

This application is a continuation-in-part of our application Serial No. 829,794, filed July 27, 1959, now abandoned.

As is well known, a wheel structure such as a sprocket wheel must often be replaced when the teeth become worn or broken. Sprocket wheel replacement is generally very costly because it is often very difficult to remove the sprocket wheel from the shaft. For example, the sprocket wheel may be rusted onto the shaft or may be positioned between other sprocket wheels, pulleys, bearings and the like so that certain of these must be removed before the sprocket wheel can be replaced. Sprocket wheel replacement is also costly because it is the general practice to replace the entire sprocket wheel and to throw away the sprocket wheel after it has been removed. Such replacement sprocket wheels generally are provided with an unfinished hub which must be bored and provided with one or more key seats so that they will fit on the shaft. In addition to these relatively heavy costs for sprocket wheel replacement, the largest cost may be the down-time of the machine on which the sprocket wheel is mounted. With the sprocket wheel as a part of the apparatus in a long production line or in a complicated machine, the down-time may result in many lost man hours and lost production. There is, therefore, a great need for a wheel construction which will make possible rapid replacement.

In general, it is an object of the present invention to provide a wheel structure with replaceable toothed segments to facilitate the replacement of broken and worn teeth.

Another object of the invention is to provide a wheel structure of the above character in which the worn and broken teeth can be replaced merely by replacing the toothed segments of the wheel structure.

Another object of the invention is to provide a wheel structure of the above character in which the hub is split to facilitate mounting of the hub on the shaft and in which the toothed segments overlap the split hub and serve to bind the split hub into a unitary assembly.

Another object of the invention is to provide a wheel structure of the above character in which cooperative means is provided for securing toothed segments to the hub and in which the cooperative means includes a flange, deformable side walls deformable into engagement with the flange and releasable securing means for compressing the side walls into engagement with the flange to thereby prevent transmission of substantial shear forces to the securing means as the wheel structure is rotated.

Another object of the invention is to provide a wheel structure of the above character in which the split hub is provided with a keyway or key seat which is split so that when the key is inserted in the seat, the hub is urged outwardly into tight engagement with the toothed segments.

Another object of the invention is to provide a wheel structure of the above character in which the recess is tapered so that when the side walls are secured to the flange, the outer surfaces of the flange are gripped between the side walls.

Another object of the invention is to provide a wheel structure of the above character which is relatively simple and which can be economically manufactured.

Another object of the invention is to provide a method for forming a wheel structure in which the hub of a conventional sprocket can be utilized as the hub for the wheel structure with replaceable toothed segments.

Additional objects and features of the invention will appear from the following description in which the preferred embodiments have been set forth in detail in conjunction with the accompanying drawings.

Referring to the drawings.

Figure 1:
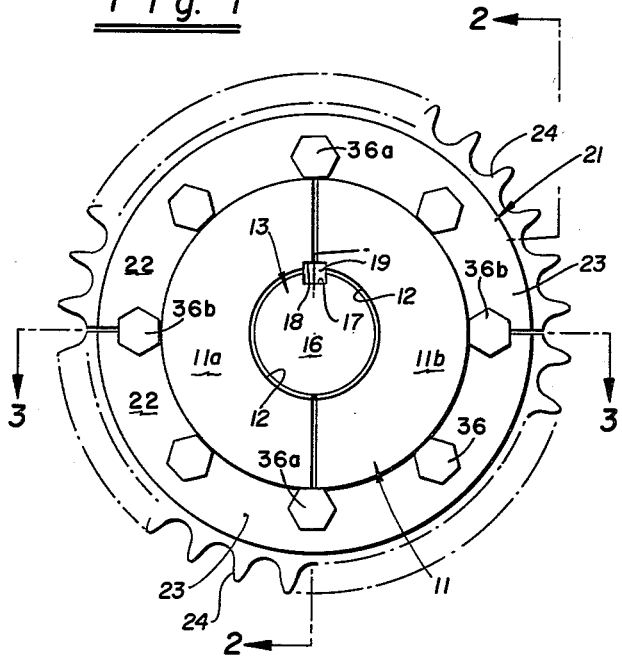
FIGURE 1 is a front elevational view of a sprocket wheel with replaceable toothed segments mounted on a shaft and incorporating the present invention.
Figure 2:
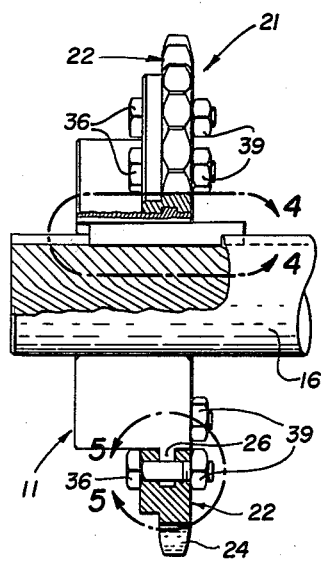
FIGURE 2 is a cross-sectional view taken along the line 2—2 of FIGURE 1.
Figure 4:
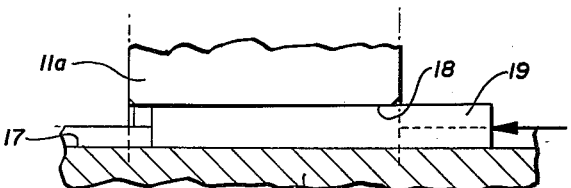
FIGURE 4 is an enlarged detail view of the portion encircled in the line 4—4 of FIGURE 2.
Figure 3:
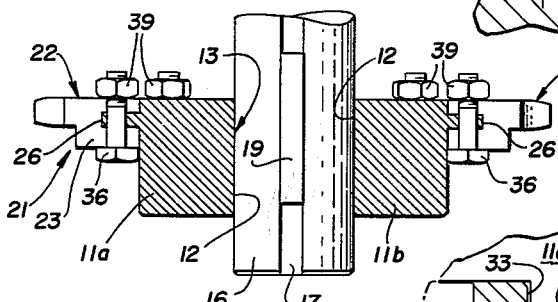
FIGURE 3 is a cross-sectional view taken along the line 3—3 of FIGURE 1.
Figure 5:
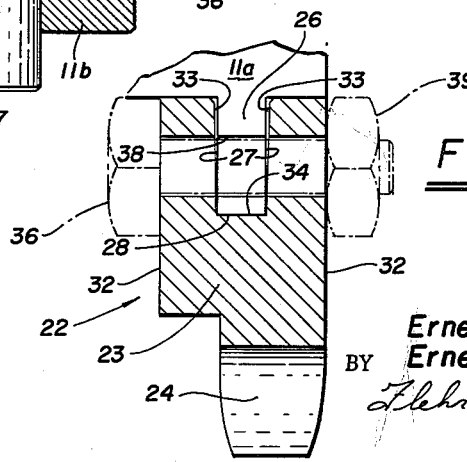
FIGURE 5 is an enlarged detail view of the corresponding portion encircled in FIGURE 2 with the bolts removed to particularly show the taper in the recess.

In general, our wheel structure with replaceable toothed segments consists of a hub which may or may not be split as hereinafter explained. At least two toothed segments are provided which are secured to the hub with cooperative means. This cooperative means consists of a flange and a body with a pair of spaced deformable side walls which define a U-shaped recess which has essentially the same configuration as the flange. The flange is seated in the recess and is secured to the side walls defining the recess in such a manner that the side walls are deformed into continuous and substantial frictional engagement with the side walls of the flange to prevent transmission of substantial shear forces to the securing means as the wheel structure is rotated. As is shown in the several embodiments, the flange can be secured to the hub or to the toothed segments and in the same manner the recess can be formed as part of the hub or as part of the toothed segments. As hereinafter explained, the recess is normally tapered to ensure that the flange is securely gripped within the recess. When a split hub is utilized, the key or the keyway may be tapered so that the hub is urged outwardly into engagement with the toothed segments so that a fit similar to a mechanical shrink fit is obtained.

In the embodiment of our invention shown in FIGURES 1–5, there is a wheel structure shown which can be called a split hub and a split-ring or split-rim type. It consists of a hub 11 which is split into two parts or sections 11a and 11b. Each of the sections 11a and 11b is provided with a semi-circular bore 12 which is adapted to mate with the other semi-circular bore 12 to provide a centrally located hole or bore 13.

The hub 11 is adapted to be mounted on a shaft 16 and cooperative means is provided for securing the hub 11 to the shaft 16. The cooperative means consists of a keyway 17 which is formed in the shaft and a keyway 18 which is formed in the hub. It will be noted that the keyway 18 is split into two portions so that one portion of the keyway is in each of the portions 11a and 11b of the hub. A key 19 is adapted to be mounted in the keyway 17 and the keyway 18 to firmly secure the hub 11 to the shaft 16 as hereinafter described. As also hereinafter described, either the keyway 18 or the key 19 can be tapered to spread apart the hub portions 11a and 11b for a purpose hereinafter decribed.

As is well known to those skilled in the art, the hub 11 can also be mounted on the shaft in several different ways. For example, if desired, a "Taper-Lock" bushing (not shown) manufactured by Dodge Manufacturing Co. of Mishawaka, Indiana can be used.

A split toothed ring-like member 21 is provided and consists of a plurality of toothed segments 22 and, as shown particularly in FIGURE 1, consists of two such toothed segments which are semi-circular in shape. The toothed segments consist of an arcuate body 23 and a plurality of teeth 24 formed on the body. Cooperative means is provided for securing the toothed segments to the hub 11. In the embodiment shown in FIGURES 1–5, the cooperative means consists of a radially extending flange 26 which is provided with parallel spaced side walls 27 and an outer annular surface 28 perpendicular to the side walls 27. The flange 26 is seated in recesses 31 formed in the bodies 23. The recesses, as shown, are substantially U-shaped in form and have the same general configuration as the configuration of the flange 26. The recess 31 is provided with a slight taper as, for example, a taper of .001 to .002 of an inch per inch of depth of the recess to make it easier to seat the flange within the recesses hereinafter described. The taper is such that the outer extremity of the recess is wider than the inner extremity.

The recess 31 is defined by deformable side walls 32 which are an integral part of the body 23. Although the side walls 32 have a substantial thickness, they are formed of a suitable material such as steel so that they are deformable in a manner hereinafter described. The recesses 31 are also defined by inner side wall surfaces 33 and a bottom wall surface 34. The bottom wall surface 34 is substantially parallel to the annular surface 28 of the flange, whereas the inner wall surfaces 33 are substantially parallel to the side walls of the radially extending side walls 27 of the flange except for the slight taper hereinbefore described which is shown in an exaggerated fashion in FIGURE 5. The inner surfaces 33 defining the grooves are provided with a chamfer 35 which also facilitates seating of the segments over the annular flange 26.

In the embodiment shown in FIGURES 1–5, the flange 26 is formed as an integral part of the hub 11 and the recesses 31 are formed in the bodies 23 of the toothed segments 22. However, as hereinafter described, the flange could be formed as a part of the toothed segments and the recess could be formed in a body provided on the hub 11.

Removable securing means forms a part of the cooperative means and is provided for securing the flange 26 within the annular recess formed by the segments 22. Such means can consist of a plurality of bolts 36 which extend through bores provided in the deformable side walls and through bores 38 extending through the flange 26. Nuts 39 are threaded onto the bolts which, when tightened, serve to deform the deformable side walls 32 into continuous and substantial frictional engagement with the side walls of the flange 26 to thereby prevent the transmission of substantial shear forces to the bolts as the wheel structure is rotated. This frictional engagement is enhanced by the fact that the recess is tapered and the outer extremities of the side walls 32 are drawn into engagement with the flange to additionally compress the outer margin of the flange into engagement with the inner wall surfaces of the recess so that relatively large pressures are applied to the respective surfaces to thereby grip and increase the frictional engagement between the toothed segments and the flange 26 carried by the hub 11. This substantial frictional engagement has been found to be very important in that a minimum of bolts is required while still retaining frictional engagement to prevent the transmission of substantial shear forces to the bolts.

The removable securing means can also take the form of rivets, the heads of which can be readily removed by those skilled in the art such as by burning or chiselling.

It will be noted that the toothed segments 22 are mounted in such a manner that they overlap the split provided in the hub 11a and, in fact, are arranged so that the split between the annular members extends at right angles to the split between the hub. This is a distinct advantage because when the toothed segments are arranged in this manner, they serve to fasten the hub portions 11a and 11b into a unitary assembly as shown in FIGURE 1.

Certain of the bolts 36 are positioned so that they align and space the hub portions 11a and 11b and also so that they align and space the segments 22. In assembling the wheel structure, two of the bolts 36 identified as 36a are inserted first to space and align the hub portions 11a and 11b. These bolts 36a, as shown, are disposed on the splits provided between the hub portions and for that reason serve to align and space the hub portions. In addition, two of the bolts 36 identified as 36b are disposed in the splits between the segments 22 and serve to align and space the segments so that the other bolts can be readily inserted in the aligned holes. The bolts 36b also ensure uniformity of tooth pitch around the circumference of the sprocket wheel by properly spacing the segments.

This embodiment of my wheel structure which is shown in FIGURES 1–5 is particularly adapted for use in locations where it is difficult or impossible to remove the old hub on the shaft. Thus, when it is difficult to remove the shaft, the old hub can be cut off the shaft or pushed aside. The new split hub can then be fastened onto the shaft by holding the two sections 11a and 11b in place while bolting the toothed segments into place. After the two toothed segments have been put in place as shown in FIGURE 1, the key can be inserted. Because either the key or the keyway is tapered, as the key is driven into place, the two halves of the split hub are urged apart into the recesses provided in the toothed segments to in effect provide something which is equivalent to a mechanical shrink fit of the flange 26 with the toothed segments 22.

It will be noted that the bolts 36 extend between the slits 41 between the segments. This is advantageous because it has been found that this firmly holds the ends of the segments in place.

If desired, the two sections of the hub can be welded to the shaft after the split hub has once been put in place. This is because after the hub has once been put in place, it will be unnecessary to remove the hub because only the toothed segments will wear out which can be readily replaced merely by removing the bolts and replacing the toothed segments.

Figures 6, 7:
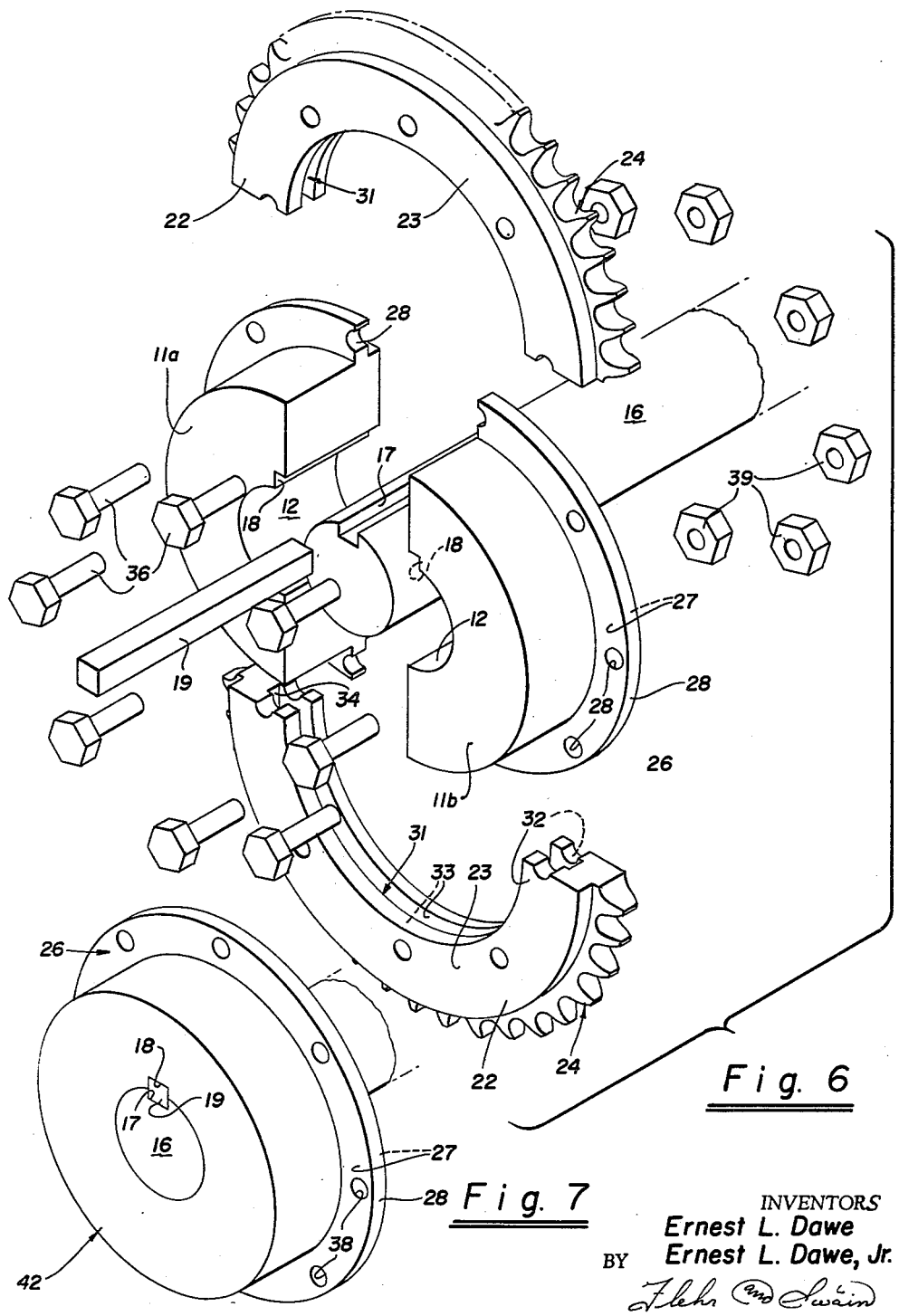
FIGURE 6 is an exploded view of the wheel structure shown in FIGURES 1–5.
FIGURE 7 is a perspective view of a hub which can be used in the wheel structure shown in FIGURES 1–6 in place of the split hub shown therein.

If desired, a solid hub 42 can be utilized as shown in FIGURE 7. When such is the case, the hub is not split and is mounted on the shaft in the same manner as a conventional hub. A hub of this type would be utilized where it is possible to readily remove the shaft the first time it is desirable to utilize one of our wheel structures. After the hub has once been put in place, it is unnecessary to again remove the hub because as the teeth wear out, the toothed segments need merely be replaced.

Figure 8:
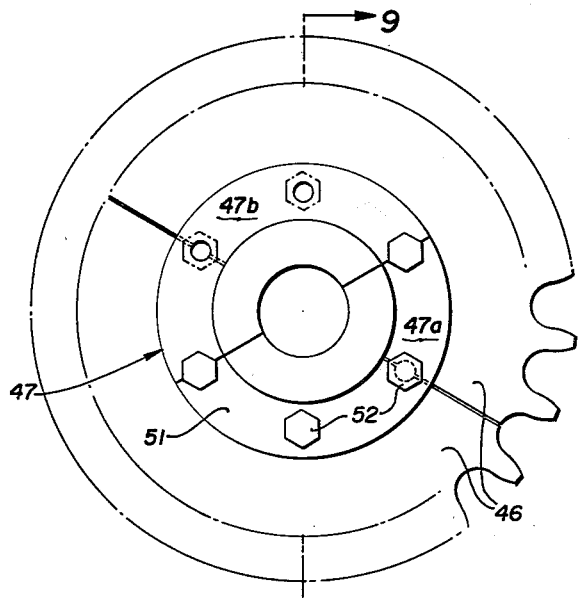
FIGURE 8 is a side elevational view of another embodiment of our wheel structure.
Figure 9:
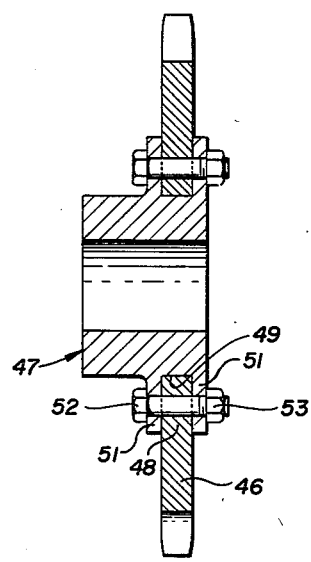
FIGURE 9 is a cross-sectional view taken along the line 9—9 of FIGURE 8.

Another embodiment of our invention is shown in FIGURES 8 and 9 which shows cooperative means for securing toothed segments 46 to a hub 47. The cooperative means consists of flanges 48 that are merely extensions of and integral with the toothed segments 46 and which seat within an annular recess 49 defined by a pair of deformable annular side walls 51 which are integral with the main body of the hub 47. The recess 49 is provided with a slight taper as in the embodiment hereinbefore described. Releasable securing means in the form of bolts 52 which extend through the side walls 51 and through the flange 48 are provided for releasably securing the toothed segments to the hub 47. The hub 47 is split into two parts 47a and 47b and is fastened together by the toothed segments 46 which are secured to the hub by means of the bolts 52. As in the previous embodiment, tightening of the nuts 53 on the bolts 52 causes compression or deformation of the side walls 51 into frictional engagement with the toothed segments 46 to prevent the application of any substantial shear forces to the bolts 52.

Figure 10:
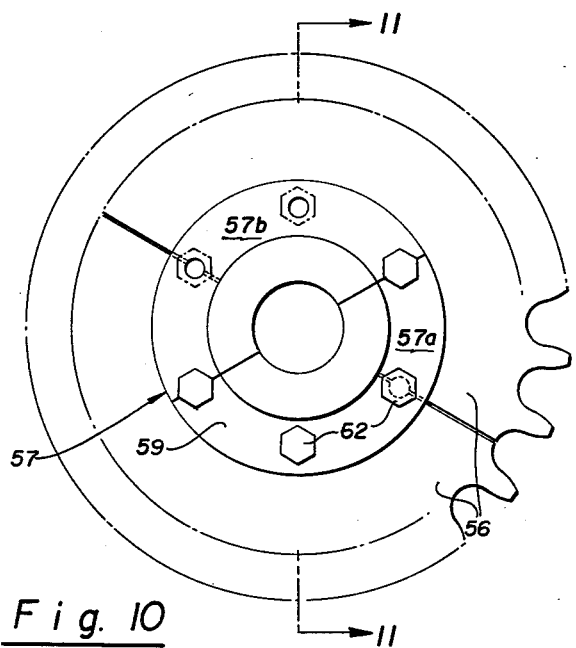
FIGURE 10 is a side elevational view of still another embodiment of our wheel structure.
Figure 11:
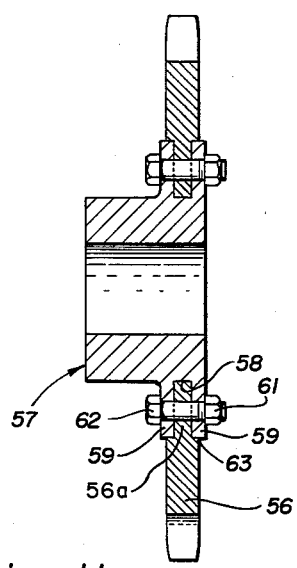
FIGURE 11 is a cross-sectional view taken along the line 11—11 of FIGURE 10.

Another embodiment of our invention is shown in FIGURES 10 and 11 which is quite similar to FIGURES 8 and 9. In this embodiment, toothed segments 56 are secured to a split hub 57 having two parts 57a and 57b by cooperative means consisting of an arcuate flange portion 56a which is formed on each of the segments and which has a width which is substantially less than the width of the toothed segment. The flanges 57 are seated within an annular recess 58 defined by a pair of deformable side walls 59 secured to the main body of the hub 57. This recess has the same general configuration as the flange with the exception that it is provided with a slight taper to provide the same tpye of gripping action as hereinbefore described when the nuts 61 are tightened on the bolts 62 to compress the deformable side walls into frictional engagement with the flange portions 56a to prevent the transmission of substantial shear forces to the bolts as the sprocket wheel is rotated.

It will be noted that in the embodiment shown in FIGURES 10 and 11, the hub 57 is again split into two parts 57a and 57b which, however, as explained previously, is not essential in that the hub can be solid if desired. It also will be noted that in the configuration shown in FIGURES 10 and 11, the segments 56 are provided with shoulders 63 which ride upon the outer faces of the side walls 59.

From the foregoing description, it can be seen that the wheel structures hereinbefore described can be utilized in many different applications. The embodiment with the solid hub can be utilized where the shaft can be removed. In such an application, the solid hub would be placed on the shaft in a suitable manner such as by keying the same to the shaft. Thereafter, it is not necessary to remove the hub because of the removable toothed segments utilized which can be replaced when the teeth become worn or broken.

Where it is impossible or very difficult to remove the shaft, a wheel structure of the type utilizing a split hub can be utilized. After the split hub has been placed on the shaft, it can be welded into place if desired because it is unnecessary to thereafter remove the hub. The removable toothed segments can then be replaced as they become worn or broken.

When new machinery is being manufactured, the new machinery can be provided with wheel structures of the type herein described so that when the teeth become worn or broken, the toothed segments may be replaced.

It will be noted that the releasable securing means utilized in the wall structures, that is, the bolts which are utilized, are positioned in such a manner that they will not interfere with the operation of a sprocket chain when the wheel structure takes the form of a sprocket wheel as shown in the drawings.

It will be noted that the wheel structure can be formed in such a manner that a hub can be provided which has incorporated as a part thereof standard means which forms a part of the cooperative means for securing the toothed segments to the hub. For example, in the embodiment shown in FIGURES 1–6, the flange provided could be of uniform diameter so that different toothed segments can be utilized on the same hub. In the same manner, in the embodiments shown in FIGURES 8–10, the recess defined by the deformable side walls 51 can be standardized to receive standard toothed segments.

When utilizing our wheel structure for the replacement of already existing sprocket wheels or gears, it is possible to form a hub particularly of the type shown in FIGURES 1–5 upon which a flange is formed by merely machining the old existing sprocket wheel to remove the teeth and to provide a flange of the desired configuration. In this way, the existing hub can be utilized and it is not necessary to machine a new bore into a stock hub or to machine a new hub. After the sprocket wheel has been machined in this manner, the hub can be provided with the standard toothed segments to provide a sprocket wheel with replaceable teeth.

It is apparent from the foregoing that we have provided a new and improved wheel structure with replaceable toothed segments and a method which can be utilized in many different applications. The wheel structure is formed in such a manner that there is no danger of shearing the bolts used to secure the toothed segments to the hub. In fact, the wheel structure can be utilized in applications having severe reversing loads without any danger of shearing the bolts. This is because of the manner in which the flange is grasped between the deformable side walls to provide substantial friction between the flange and the side walls to thereby prevent the application of substantial shear forces to the securing bolts. When a machine is equipped with wheel structures of the type herein described, the teeth can be replaced with very little effort and within a very short time merely by replacing the toothed segments. In addition to a decrease in the down-time of the machine on which the sprocket wheel or wheels are located, the man hours required for replacement of the sprocket wheel teeth are greatly reduced as is the cost of replacement itself. The cost of the replacement toothed segments is substantially less than that of a complete sprocket wheel, particularly in view of the fact that the sprocket wheel hub must normally be machined to fit the shaft on which the sprocket wheel is to be mounted.

Although our invention has been described principally in conjunction with sprocket wheels, it is readily apparent that the invention can be used for all types of wheel structures having teeth such as various types of gears. Also, it is apparent that it can be used for flat and grooved pulleys as well as gears. For example, with pulleys, it may be desirable to use our invention to make it readily possible to change the pulley surface or its diameter.

Although we have described our invention with the recesses being tapered, it is readily apparent that, if desired, the flanges can be tapered and the recesses can have straight side walls to obtain the same desirable features of our invention. Also, if desired, the flanges and the recesses can have straight side walls. However, when such is the case, the recesses should have a width slightly greater than the width of the flanges so that the side walls forming the recesses can be deformed into substantial frictional engagement with the flanges for the purposes hereinbefore described.

Although we have described our invention as using direct frictional engagement between the side walls forming the recess and the flange, the invention can also be practiced by using indirect fricitonal engagement between the walls forming the recess and the flange such as by using shims which are placed in the recess between the walls forming the recess and the flange.

We claim:
1. In a wheel structure with replaceable segments, a hub, at least two segments and cooperative means for securing the segments to the hub, said cooperative means comprising a substantially continuous annular flange, a pair of spaced resiliently deformable walls defining an unobstructed recess having substantially the same configuration as the flange, the recess receiving the flange being dimensioned so that there is a relatively good fit between the flange and the side walls, and releasable securing means engaging the deformable side walls and said flange to deform the side walls into substantial frictional engagement with the side walls of the flange to provide the sole means for preventing transmission of substantial shear forces to the releasable securing means.

2. A wheel structure as in claim 1 where said flange is integral with the hub and wherein the pair of spaced deformable walls are integral with the segments.

3. A wheel structure as in claim 1 wherein the flange is integral with the segments and wherein the pair of spaced deformable walls are integral with the hub.

4. A wheel structure as in claim 1 wherein said recess is tapered so that it is wider on its outer extremity, said taper causing the inner portions of said side walls to more firmly clamp the outer margin of the flange.

5. A wheel structure as in claim 1 wherein said hub is split into two separate parts and wherein the segments overlap the split in the hub.

6. In the combination of a wheel structure mounted on a shaft, the wheel structure comprising a hub split into two separate parts, at least two segments, and cooperative means securing the segments to the hub, said cooperative means comprising a substantially continuous annular flange, a substantially continuous annular body having a pair of spaced resiliently deformable side walls defining a substantially U-shaped unobstructed recess in the body having a configuration in cross section substantially the same as the configuration of the flange in cross section, the recess receiving the flange and being dimensioned so that there is a relatively good fit between the flange and the side walls of the body, and releasable securing means engaging the deformable side walls and said flange to deform the side walls into substantial frictional engagement with the flange to thereby prevent the transmission of substantial shear forces to the releasable securing means engaging the deformable side walls and the flange, said segments overlapping the split in the hub so that the ends of the segments are spaced from the split in the hub, said segments together with said cooperative means serving to retain the hub in a unitary assembly.

7. In a wheel structure with replaceable tooth segments, a hub, a radially extending substantially continuous annular flange mounted on the hub and being integral therewith, at least two toothed segments, each of said toothed segments having a pair of spaced resiliently deformable side walls defining a U-shaped recess having substantially the same configuration in cross section as the configuration of the cross section of the flange, the recesses in the toothed segments into substantial frictional engagement sioned so that there is a relatively good fit between the flange and the side walls of the toothed segments, and releasable securing means engaging the deformable side walls and the flange to deform the side walls of the toothed segments into substantial frictional engagement with the side walls of the flange to provide the sole means preventing transmission of substantial shear forces to the releasable means as the wheel structure is rotated.

8. A wheel structure as in claim 7 wherein the hub is split into two sections and wherein two of the segments overlap the portions of the hub at which the split occurs to form the hub and the toothed segments into a unitary assembly.

9. A wheel structure as in claim 7 wherein the recesses in the toothed segments are formed with a taper so that the recess is wider at its outer extremity, the taper in the recess causing the deformable side walls to grip the outer portions of the flange more firmly than the other portions of the flange.

10. In a wheel structure with replaceable toothed segments, a hub, a pair of spaced resiliently deformable substantially continuous annular side walls integral with the hub and defining an unobstructed U-shaped recess, at least two toothed segments, the toothed segments having arcuate flange portions having a configuration in cross-section substantially the same as the configuration of the recess in cross section, the flange portions being seated in the recess and being dimensioned so that there is a relatively good fit between the flange portions and the side walls forming the recess and releasable securing means engaging the deformable side walls and the flange portions to deform the deformable side walls into substantial frictional engagement with the side walls of the flange portions to thereby prevent transmission of substantial shear forces to the releasable means.

11. A wheel structure as in claim 10 wherein the hub is split into two parts and wherein two of the segments overlap the portions of the hub at which the split occurs to form the hub and the toothed segments into a unitary assembly.

12. A wheel structure as in claim 10 wherein the recess is formed with a taper so that the recess is wider at its outer extremity, the taper in the recess causing the side walls forming the recess to more firmly grip the outer surfaces of the flange portions.

13. In a wheel structure with replaceable segments, a hub, at least two segments, cooperative means for securing the segments to the hub, said cooperative means comprising a substantially continuous annular flange, a pair of spaced resiliently deformable substantially continuous annular side walls defining an unobstructed recess having substantially the same configuration in cross section as the cross section of the flange, the flange having substantially parallel outer surfaces, the recess being tapered so that it is wider on its outer extremity and releasable securing means engaging the deformable side walls and the flange to deform the side walls into substantial frictional engagement with the outer surfaces of the flange to provide the sole means for preventing transmission of substantial shear forces to the releasable securing means.

References Cited in the file of this patent
UNITED STATES PATENTS

| | | |
|---|---|---|
| 688,570 | Anthony et al. | Dec. 10, 1901 |
| 1,163,276 | Sparling | Dec. 7, 1915 |
| 1,378,156 | Watts | May 17, 1921 |
| 1,406,110 | Troutner | Feb. 7, 1922 |
| 2,465,570 | Bocchino | Mar. 29, 1949 |
| 2,525,516 | Bergmann et al. | Oct. 10, 1950 |
| 2,579,749 | Mercier | Dec. 25, 1951 |